US012464279B2

(12) United States Patent
Kuhtz et al.

(10) Patent No.: US 12,464,279 B2
(45) Date of Patent: Nov. 4, 2025

(54) EAR PAD OR EARMOLD FOR AN EARPHONE, AND EARPHONE WITH AN EAR PAD OR EARMOLD

(71) Applicant: Sonova Consumer Hearing GmbH, Wedemark (DE)

(72) Inventors: Jan Peter Kuhtz, Celle (DE); Anders Hed, Wedemark (DE); Werner Pfeffer, Hannover (DE)

(73) Assignee: Sonova Consumer Hearing GmbH, Wedemark (DE)

( * ) Notice: Subject to any disclaimer, the term of this patent is extended or adjusted under 35 U.S.C. 154(b) by 210 days.

(21) Appl. No.: 18/228,498

(22) Filed: Jul. 31, 2023

(65) Prior Publication Data

US 2024/0048890 A1 Feb. 8, 2024

(30) Foreign Application Priority Data

Aug. 4, 2022 (EP) .................................... 22188713

(51) Int. Cl.
*H04R 1/10* (2006.01)

(52) U.S. Cl.
CPC ........... *H04R 1/105* (2013.01); *H04R 1/1066* (2013.01); *H04R 2430/01* (2013.01)

(58) Field of Classification Search
CPC .. H04R 1/105; H04R 1/1066; H04R 2430/01; H04R 2420/07; H04R 2460/11; H04R 1/1016; H04R 1/1091; H04R 1/2811; H04R 1/1058; H04R 2201/105; H04R 1/2853; H04R 1/1083; H04R 2410/00; H04R 1/1075; H04R 1/2819; H04R 1/1041; G10K 11/22; G10K 11/178
See application file for complete search history.

(56) References Cited

U.S. PATENT DOCUMENTS

| | | | | |
|---|---|---|---|---|
| 4,442,917 A | | 4/1984 | Johnson | |
| 5,659,156 A | | 8/1997 | Mauney et al. | |
| 8,331,604 B2 | * | 12/2012 | Saito | H04R 1/1083 381/328 |
| 2010/0166245 A1 | * | 7/2010 | Takigawa | H04R 1/1041 381/380 |

(Continued)

FOREIGN PATENT DOCUMENTS

DE 102017126214 A1 5/2019

OTHER PUBLICATIONS

Extended European Search Report mailed on Jan. 30, 2023 in corresponding application EP22188713.6.

*Primary Examiner* — Angelica M Mckinney
(74) *Attorney, Agent, or Firm* — ALG Intellectual Property, LLC

(57) ABSTRACT

Earphones intended for being worn in the ear canal (in-ear headphones) usually contain an ear pad, which the user may exchange for other ear pads of different sizes. Also earmolds, which are alternatively useable, can easily be exchanged. The ear pad or earmold can be mounted on a receptacle of the earphone. For mechanically or acoustically adjusting the frequency response of the earphone, the ear pad or earmold has at least one cavity. When the ear pad or earmold is mounted on the earphone's receptacle, the cavity is acoustically connected with the sound channel of the ear pad or earmold and is adapted for acting as an acoustic resonator, in particular as a Helmholtz resonator, in the audible frequency range.

16 Claims, 5 Drawing Sheets

(56) References Cited

U.S. PATENT DOCUMENTS

| | | | | |
|---|---|---|---|---|
| 2012/0201406 | A1* | 8/2012 | Yamaguchi .......... | H04R 1/1016 381/309 |
| 2015/0023541 | A1* | 1/2015 | Ho ....................... | H04R 1/1016 381/380 |
| 2017/0118548 | A1 | 4/2017 | Liu et al. | |
| 2021/0058694 | A1 | 2/2021 | Sampei | |
| 2021/0195310 | A1* | 6/2021 | Kim ..................... | H04R 1/1016 |

* cited by examiner

EAR PAD OR EARMOLD FOR AN EARPHONE, AND EARPHONE WITH AN EAR PAD OR EARMOLD

RELATED APPLICATIONS

The present application claims priority to EP Patent Application No. 22188713.6, filed Aug. 4, 2022, the contents of which are hereby incorporated by reference in their entirety.

BACKGROUND INFORMATION

Earphones, in particular if they are intended to be worn within the ear canal or auditory canal (in-ear headphones), usually contain an ear pad, also called cushion or ear tip, or an earmold. The ear pad or earmold ensures a pleasant wearing comfort for the user and at the same time shields the user from ambient noise by sealing the auditory canal as far as possible. The unpleasant occlusion effect that occurs can be counteracted by ventilation, as described in more detail below. The ear pad should be adapted to the diameter of the individual user's ear canal and can therefore usually be exchanged for other ear pads of different sizes by the user. It is placed on a receptacle or nozzle, which forms part of the housing of the actual headset and which is usually in the form of a small tube. This tube forms the sound outlet for the sound generated by the sound transducer inside the housing. The sound passes the tube and thus also the ear pad. Therefore, when the earphone is worn in the ear, the sound exits the ear pad directly into the user's ear canal.

There are various solutions for equalizing pressure by venting the inner volume between the earphone and the eardrum, connecting this volume to the ambient air. One possibility is shown in FIG. 1. Here, in a known earphone 100, an ear pad or cushion 120 is attached to a tube 130 acting as an ear pad receptacle and forming a part of the housing 110 of the earphone 100. A wax filter 125 and/or a protective grid 131, which are acoustically transparent, can be in the sound channel. A ventilation slot 150 runs along the outside of the tube 130, connecting the inner volume with the ambient air for pressure equalization. The inner volume includes the sound channel, i.e. the volume in front of the sound transducer 140 inside the tube 130, as well as the sound channel with the wax filter 125 in the ear pad 120 and the volume in the user's auditory canal between the earphone 100 and the eardrum (not shown in FIG. 1).

Another earphone is known from DE102017126214A1. As shown in FIG. 2, it enables the user to adapt the ear pad 120' to the depth of his/her ear canal by sliding the ear pad 120' on the tube 130' along its length axis. Two possible latching positions are provided. For this purpose, the ear pad contains two inner circumferential grooves 121', 122'. The latching positions are defined in that a projection on the tube 130' can latch into one of the two grooves. However, no vent is provided here, or ventilation is done elsewhere.

The cavities present in the known earphones and ear pads mentioned above have no acoustic effect. However, it is generally desirable to be able to adjust the frequency response of the earphones mechanically, or acoustically respectively. This applies to built-in adjustments as well as to those that the user can configure individually. Such adjustments usually require resonators to tune the frequency response, which need volume and which are usually provided inside the housing.

BRIEF DESCRIPTION OF THE DRAWINGS

Further details and advantageous embodiments are depicted in the drawings, showing in FIG. 1 a sectional drawing of a known earphone with a ventilation slot in the ear pad receptacle.

DETAILED DESCRIPTION

Figure 1:
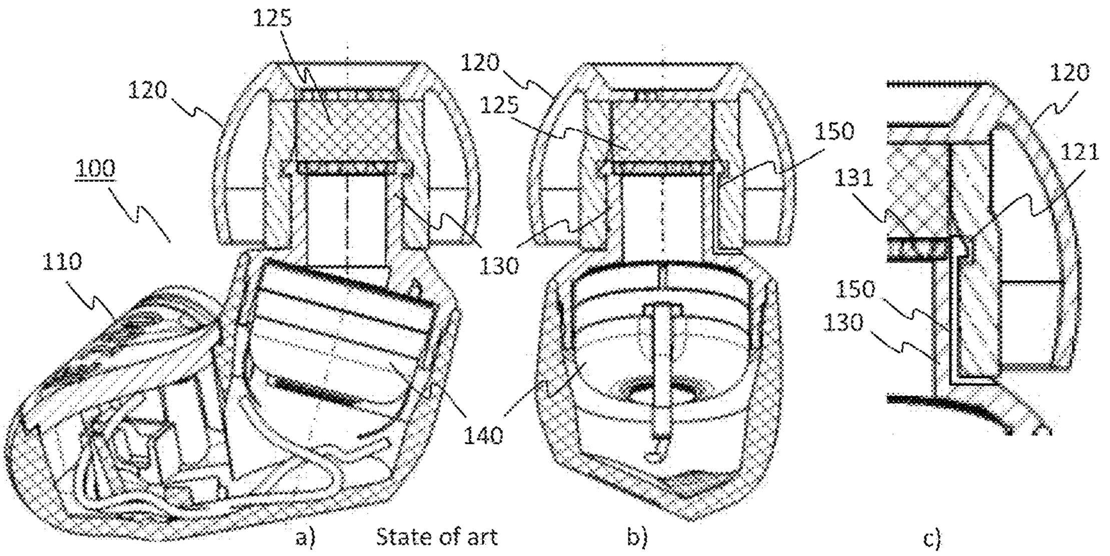
Figure 2:
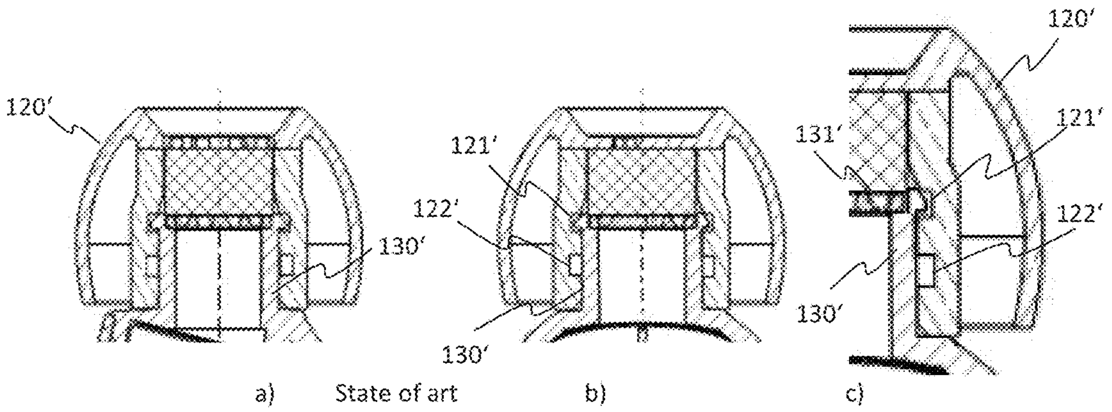
FIG. 2 a sectional drawing of a portion of a known earphone with an ear pad that can snap into different locking positions of the receptacle.

The present disclosure relates to an ear pad or earmold for an earphone. Furthermore, the embodiments described herein relate to an earphone, in particular an earphone with an ear pad or earmold.

A feature of the embodiments described herein is the above-mentioned problem of frequency response adjustment. This problem is solved by an ear pad or earmold for an earphone as described herein.

According to an embodiment, described herein are an ear pad or earmold for an earphone, which may be mounted on an ear pad receptable of the housing of the earphone. The receptacle also serves as sound channel of the housing. The ear pad or earmold has at least one recess in its inner area that encloses the ear pad receptacle when assembled. Thus, the recess in the ear pad or earmold forms a cavity in the assembled earphone. When assembled, the recess or cavity is acoustically connected to the sound channel of the ear pad or earmold and/or to the sound channel of the receptacle, and it is suitable and adapted for acting as an acoustic resonator in the audible frequency range.

According to another embodiment, an earphone comprises a housing and an ear pad or earmold that can be mounted on a receptacle of the housing. The receptacle serves as sound channel of the housing and may have the form of a small tube, with a substantially circular or oval cross-section, for example. Sound coming from a sound transducer within the housing can be guided out of a first opening in the receptacle and/or through a sound channel within the ear pad or earmold into the user's auditory canal. The ear pad or earmold has at least one recess which, by mounting the ear pad or earmold on the receptacle, becomes a cavity that is acoustically connected to the sound channel of the ear pad or earmold and/or to the sound channel of the receptacle and that is suitable and adapted for acting as an acoustic resonator in the audible frequency range. In addition to the acoustic connection with the sound channel, the cavity can also be connected to the ambient air via a vent or ventilation slot; however, apart from that, it forms a substantially closed volume when assembled. The acoustic connection of the volume with the sound channel is made such that the volume acts as a Helmholtz resonator.

An advantage of the embodiments described herein is that the resonator needs not be provided within the housing of the earphone, so that volume may be saved and the housing may be small. A further advantage is that the resonator acts as an acoustic filter to correct or adjust the frequency response of the earphone. The center frequency and the quality or Q factor of the filter are determined by the resonator volume and/or the connection of the resonator volume to the inner volume. Thus, the frequency response and the resonant frequencies are determined not only by the design of the earphone and the individual geometry of the user's ear canal but can also be changed later with the ear pads or earmold. In particular, the user can set an individually comfortable frequency response of the earphones by configuring or selecting a suitable ear pad or earmold. In the embodiments described below, the user can generally exchange the ear pad and/or rotate it relative to the earphone housing. In some embodiments, the user can selectively either establish or disrupt an acoustic connection of the sound channel with the at least one cavity by rotating the ear pad or earmold.

FIGS. 1-3, 5, 9 and 10 each represent two sectional drawings of different planes which are rotated by 90° relative to one another, as well as a detail of the section each.

Figure 3:
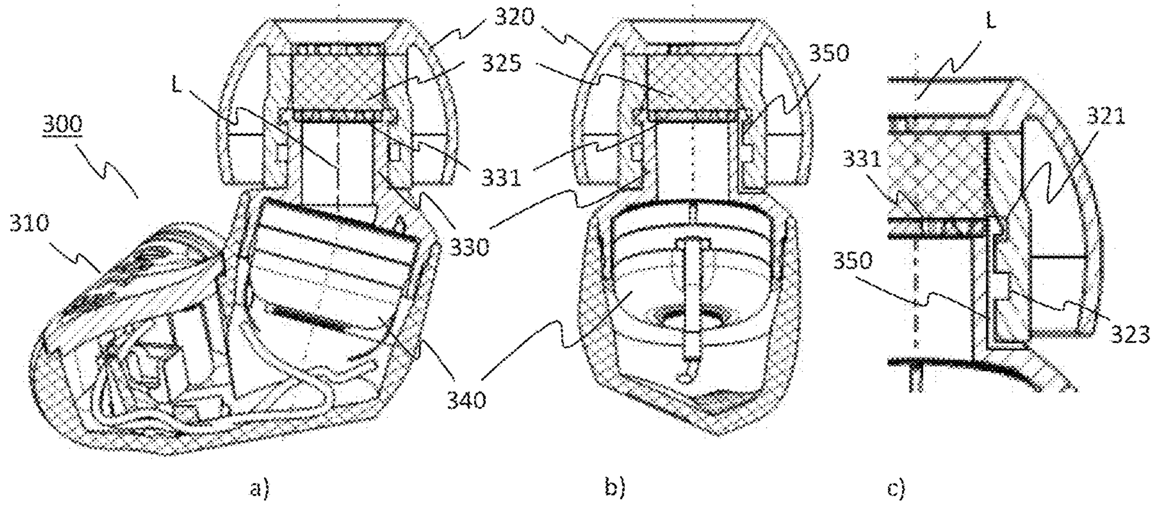
FIG. 3 a sectional drawing of an earphone in an embodiment with a ventilation slot in the ear pad receptacle connecting a circumferential cavity as a resonator.

FIG. 3 shows a sectional drawing of an earphone 300 according to an embodiment. The housing 310 of the earphone 300 is typically made of a stiff material such as hard plastic or metal and contains a tubular cushion receptacle 330 onto which the ear pad or cushion 320 can be snapped. The cushion 320 is a flexible, separate element made of, for example, silicone. The sound transducer 340 is located within the housing 310 and emits the sound through the sound channel 328, 338 in the receptacle 330 and in the cushion 320. Optionally, an acoustically transparent wax filter 325 and/or a protective grid 331 can be located in the sound channel 328. When the cushion 320 is inserted into the user's ear canal, an inner volume is created in which the sound is guided. The inner volume includes the user's ear canal and the sound channel 328, 338 in the cushion 320 and in the receptacle 330. In order to ventilate this inner volume and to enable pressure equalization, and thus to avoid or at least reduce the occlusion effect, the receptacle 330 contains an axially running ventilation slot 350 on the outside, which connects the inner volume with the ambient air.

The cushion 320 comprises a groove 321 (which in this example is circumferential) that serves to attach the cushion 320 to the housing 310 and that is filled by the projection of the receptacle 330 when assembled. Therefore, the groove 321 has no acoustic effect.

In addition, however, the cushion 320 contains a circumferential or partly circumferential cavity 323 (i.e. extending annularly over the entire inner circumference of the cushion, or extending over only a portion of the inner circumference of the cushion) which is acoustically connected to the inner volume via the ventilation slot 350. Because of its volume and because of the narrow slot 350, this cavity 323 acts as a Helmholtz resonator for a specific frequency. This frequency is essentially determined by the volume of the cavity 323, but also by the length and the cross-sectional area of the connection 350 between the sound channel and the cavity 323. By skillfully selecting the parameters mentioned, in particular the size and thus the volume of the cavity 323, the resonant frequency is in the audible frequency range and can be used for adjusting the frequency response of the earphone. Since the volume of the cavity 323 depends only on the ear pad 320, the user or the manufacturer can change the resonant frequency and thus the frequency response of the earphone by changing the ear pad to another one with a different cavity volume. The volume of the cavity may generally be in the range of, for example, 1.7-10 $mm^3$, and in particular e.g. 5.5-7 $mm^3$ and in special cases up to 15 $mm^3$. That is, the volume of the cavity is considerably smaller than the volume of the sound channel 328 within the ear pad, exemplarily by a factor in the range of 5-35.

Figure 4:
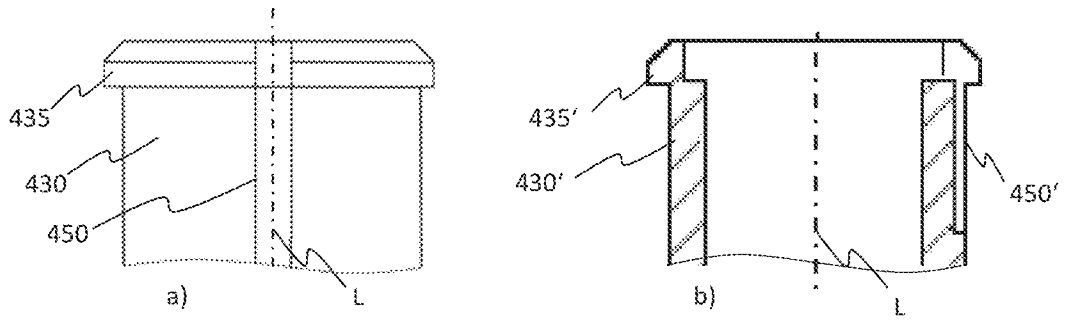
FIG. 4 a view and a sectional drawing of an ear pad receptacle in a first embodiment with a slot.

FIG. 4 *a*) shows a view of a corresponding cushion receptacle 430 in a first embodiment. The receptacle 430 has a projection or collar 435 at the top, which can engage in the circumferential groove 321 of the pad 320, thus attaching the pad 320 to the housing 310. Other solutions for this, e.g. non-circumferential, partly circumferential, or nose-like projections and corresponding recesses, are possible. In addition, the cushion receptacle 430 has an axial slot 450 on the outside for the acoustic connection of the resonator 323 and for ventilation of the inner volume. The slot is very narrow (not depicted to scale), e.g. 0.2-0.3 mm wide (or 0.2-1 mm, in other variants).

In a similar embodiment, FIG. 4 *b*) shows a sectional drawing of a cushion receptacle 430' with a slot that is only used for acoustically connecting the resonator, and that therefore does not reach to the lower base of the cushion receptacle. The slot also extends to the collar 435' so that the slot 450' is acoustically connected to the sound channel inside the cushion receptacle when the ear pad is mounted; thus, the slot breaks through the collar 435'. In this case, the slot is not used for ventilation to reduce the occlusion effect. However, a ventilation may be achieved differently.

Figure 5:
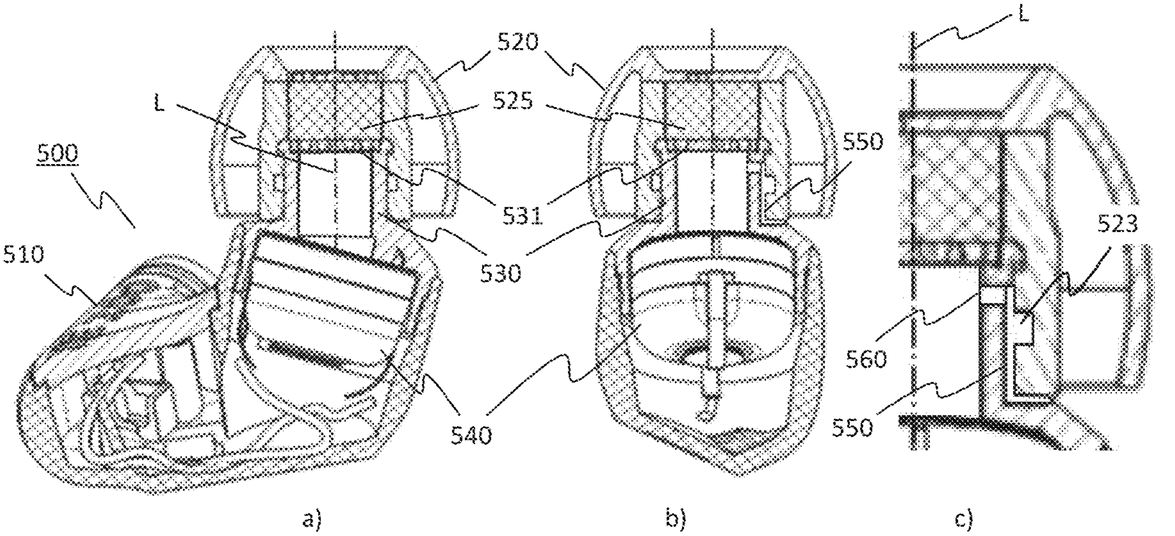
FIG. 5 a sectional drawing of an earphone in a second embodiment with a bore in the ear pad receptacle and a circumferential cavity as a resonator.

FIG. 5 shows a sectional drawing of an earphone 500 in a second embodiment. As above, the earphone 500 comprises a housing 510 with an acoustic transducer 540 and a cushion receptacle 530 onto which a cushion or ear pad 520 can be placed and secured as described above. However, the axial slot 550 on the outside of the receptacle 530 does not extend as far as the upper projection or collar but is connected to the sound channel through a lateral opening 560 (e.g., a bore) in the receptacle 530. The cushion 520 contains an at least partly circumferential recess 523 which, when assembled, forms a cavity that acts as a resonator, since it is acoustically connected to the inner volume via a portion of the slot 550 and the bore 560. In this example, the bore 560 is slightly above the cavity 523. Alternatively, the bore 560 can also be located at the level of the cavity 523 and hit it directly or partially. The acoustic resistance (i.e., the length and the cross-sectional area) of the connection between the sound channel and the cavity has an impact on the effect of the resonator. One advantage of this embodiment is that the collar and the upper portion of the cushion receptacle are not weakened by the slot. Thus, the inserted protective grid 531 is more securely fixed. In addition, the diameter, and hence the cross-sectional area, of the bore can be precisely controlled during manufacture, and it is independent of the width of the slot, which can result in a high Q factor of the resonator. Thus, a desired resonant frequency can be met more precisely.

Figure 6:
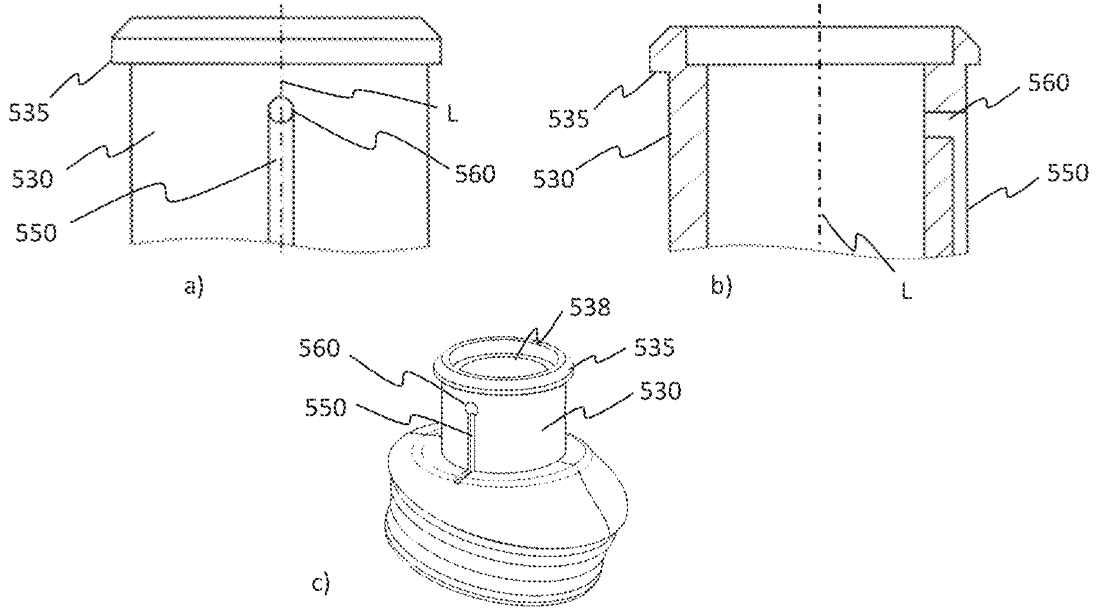
FIG. 6 a view and a sectional drawing as well as a perspective overall view of an ear pad receptacle in a second embodiment with a bore and a slot, which is also used for ventilation.

FIG. 6 shows a view and a section as well as a perspective overall view (with base) of a corresponding cushion receptacle 530. Inside the receptacle 530 is the sound channel 538. When the ear pad is mounted on the receptacle 530 and fixed at the collar 535, the sound channel is acoustically connected via the bore 560 and the slot 550 both to the ambient air and to the volume 523 inside the ear pad 520, so that this volume 523 (together with the connection, as explained above) can act as a resonator.

Figure 7:
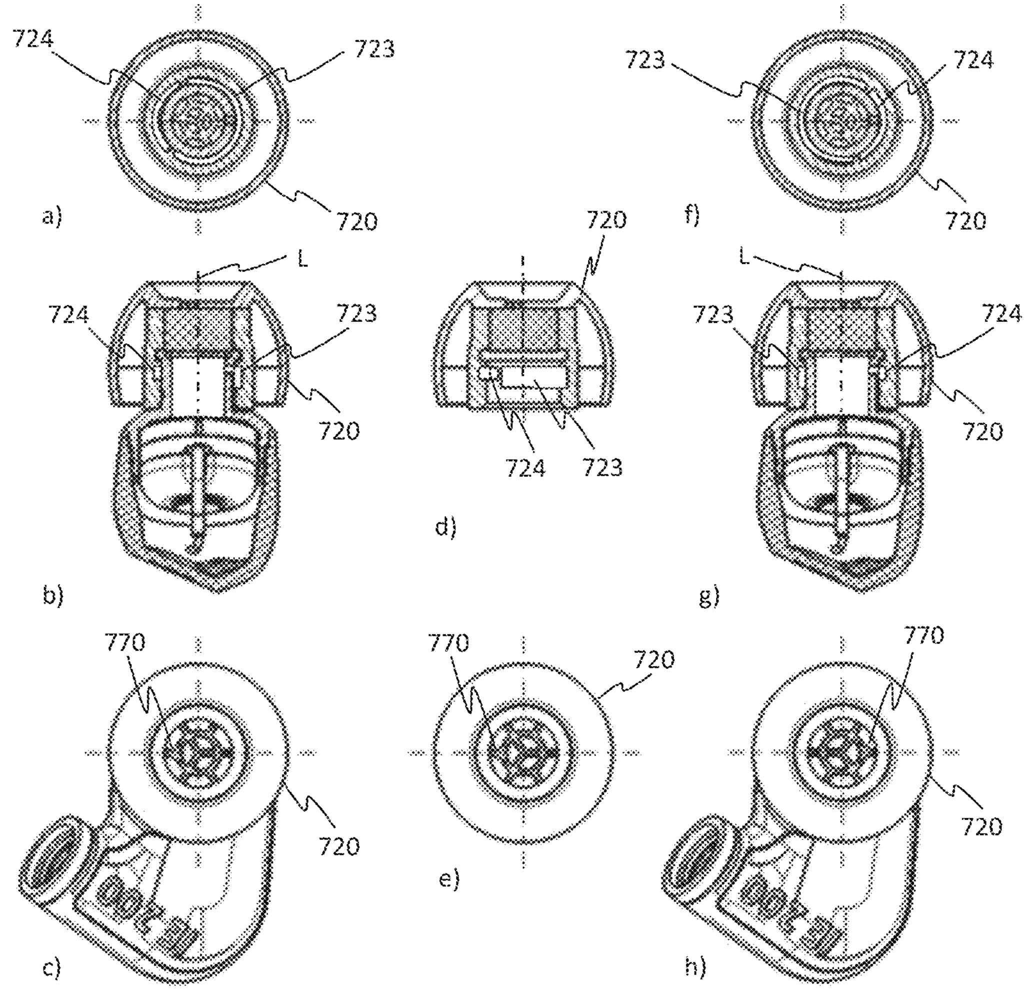
FIG. 7 sectional drawings of an earphone and an ear pad in an embodiment with a plurality of only partially circumferential cavities as resonators that can be adjusted by the user.

FIG. 7 shows sectional drawings and views of an earphone and an ear pad 720, in an embodiment. The ear pad 720 contains a plurality of recesses (or cavities when mounted) 723, 724, which are only partially circumferential. That is, each of the recesses 723,724 does not span an angle of 360° around the longitudinal axis L, but only a smaller angle $\alpha_1$, $\alpha_2$. The cavities that are formed by the recesses when mounted have different volumes and can be used as resonators with different resonant frequencies in the audible frequency range, which can be adjusted by the user. For this, the user may exchange the ear pad, or rotate it relative to the housing. As mentioned above, the volume of the cavities is much smaller than the remaining volume of the sound channel within the ear pad. Exemplarily, there may be a factor between the volumes of the cavities relative to the volume of the sound channel (excluding the cavities) of $X_1$ for the smaller cavity, with $X_1$ in the range 25-30, and a factor of $X_2$ (with $X_2$ in the range 7-10) for the larger cavity. FIGS. 7 *a*) and *f*) each show a horizontal section through the ear pad at the level of the recesses or cavities respectively, whereby the ear pad 720 in FIG. 7 *f*) is rotated by about 180 degrees about its longitudinal axis L (i.e. in the drawing plane of FIG. 7 *a*), *f*)) compared to FIG. 7 *a*). FIGS. 7 *b*) and *g*) each show a vertical section through the earphone with the ear pad 720 mounted. In FIG. 7 *b*), the larger cavity 723 is connected to the sound channel, while in FIG. 7 *g*) it is the smaller cavity 724 due to the rotated ear pad. This results in different resonant frequencies, and thus in different frequency responses of the earphone. The user can choose between the two positions by rotating the ear pad. As shown in FIG. 7 *d*) in the sectional drawing through the ear pad 720, the two recesses 723, 724 are located essentially at the same level inside the ear pad and are separated from one another. They may span different angles $\alpha_1$, $\alpha_2$ and/or have different depths and/or different widths, and thus have different volumes. In a variant, one of the two recesses or cavities can be omitted (i.e., its volume is zero), so that only one partially circumferential recess or cavity exists, and the user can switch on or off the resonator effect by rotating the ear pad relative to the earphone housing along its length axis L. FIG. 7 *e*) shows a view of the adjustable ear pad with an indication 770 that indicates the position of at least one of the cavities to the user. Finally, FIGS. 7 *c*) and *h*) show views of the earphone with the ear pad 720 mounted, each in one of the stated positions, wherein the position of one of the resonators 723, 724 is indicated by the indicator 770. Instead of the indicator, or in addition, a mechanical positioning aid can also be provided.

In this example, the respective cavity 723, 724 is acoustically connected to the inner volume via a bore in the receptacle, as described above. Alternatively, however, it can also be acoustically connected via a slot that breaks through the collar 735, as described above. Moreover, it is also possible to provide further recesses or cavities inside the cushion which can be selected as resonators by the user, as described above. In similar embodiments, the inner wall of the ear pad, which is the wall of the sound channel and which contains the resonator cavities, can be made thicker than illustrated. In addition, more than one bore can be provided, so that two or more resonators can be combined with one another. In this case, it may also make sense to use two or more resonators that have equal volumes. For example, alternatively to the two cavities 723, 724 being located essentially at the same level inside the cushion, they can be located at different levels along the length axis inside the cushion while still being separated from one another, and the receptacle 530 has at least two lateral openings or bores 560, which are also at different levels along the length axis. In that case, each cavity 723,724 can be connected separately via one of the openings to the sound channel 538. This enables the user to select whether to use one or both resonators, or none, by rotating the ear pad relative to the earphone housing along its length axis L.

The user can, by rotating the ear pad, select between at least a first position in which a cavity 723 is acoustically disconnected from the sound channel and a second position in which the cavity 723 is acoustically connected to the sound channel. There may be more positions, such as e.g. one or more of: a position in which the cavity 723 is acoustically connected to the sound channel via a first bore or slot and another position in which it is acoustically connected via a different second bore or slot, a position in which the second cavity 724 instead of the first cavity 723 is acoustically connected to the sound channel, and a position in which both cavities 723, 724 are acoustically connected to the sound channel. With each position, the acoustic properties of the earphone change. The user can select at any time according to his or her personal preference.

Figure 8:
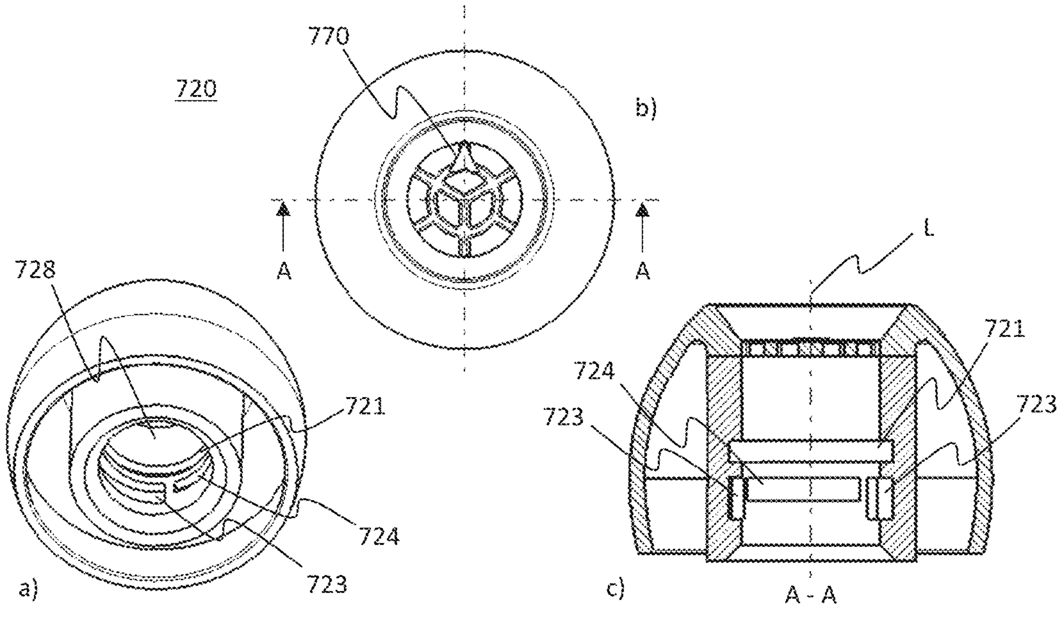
FIG. 8 views and a sectional drawing of an ear pad in an embodiment with a plurality of recesses that are only partially circumferential.

FIG. 8 shows views and a sectional drawing of an ear pad in an embodiment with two recesses for forming cavities 723, 724 that are only partially circumferential and at least partially at the same height with respect to a longitudinal axis L, as in FIG. 7. Each recess is an open groove as long as the ear pad 720 is not mounted on the receptacle; when mounted, the outer wall of the receptacle closes the volume, thus making the recess a cavity. The ear pad 720 has an indicator 770 indicating the position of e.g. one of the cavities. An additional recess or groove 721 serves to accommodate the collar 735 of the receptacle 730 for fastening the cushion to the housing. However, when the cushion is mounted on the housing, the cavities 721, 723, 724 in the opening 728 are not directly in the sound channel; instead, the groove 721 is filled by the projection 435, 535, 735 and thus has no acoustic effect, and the cavities 723, 724 are acoustically connected to the sound channel as described above. The upper part of the opening 728 belongs to the sound channel and can optionally include an acoustically transparent wax filter. The ear pad 720 can be entirely made of a single material. Alternatively, the ear pad 720 can be made of a plurality of different materials, optionally with different degrees of hardness, whereby particularly the outer area that is intended for contacting the user's ear canal should be made of a softer material, such as e.g. silicone.

Figure 9:
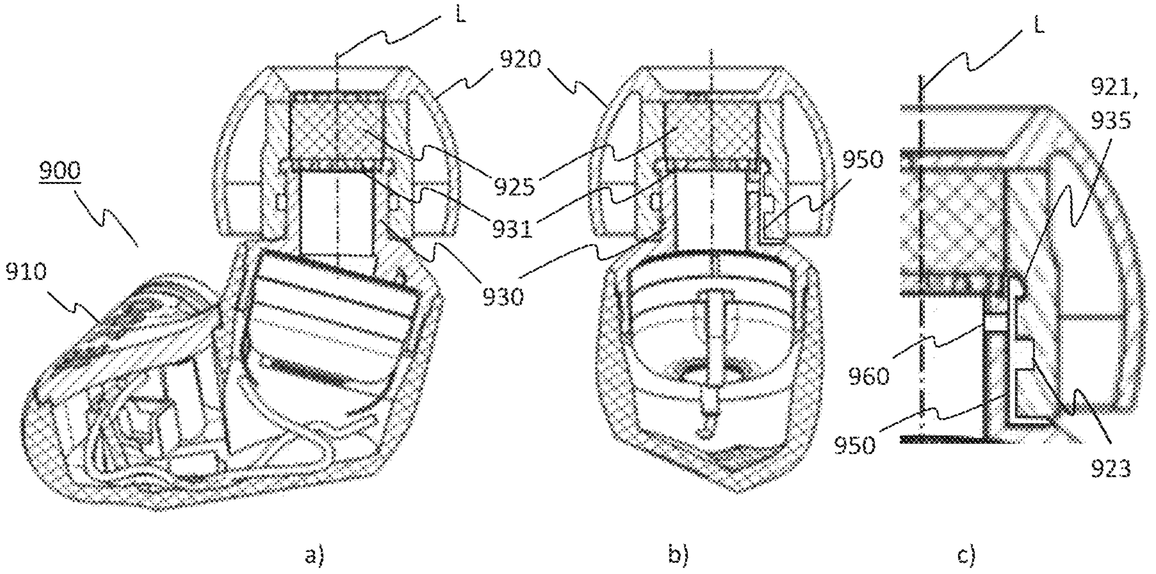
FIG. 9 a sectional drawing of an earphone in an embodiment with a bore in the ear pad receptacle and an adjustable ear pad in a first (lower) position with the resonator.
Figure 10:
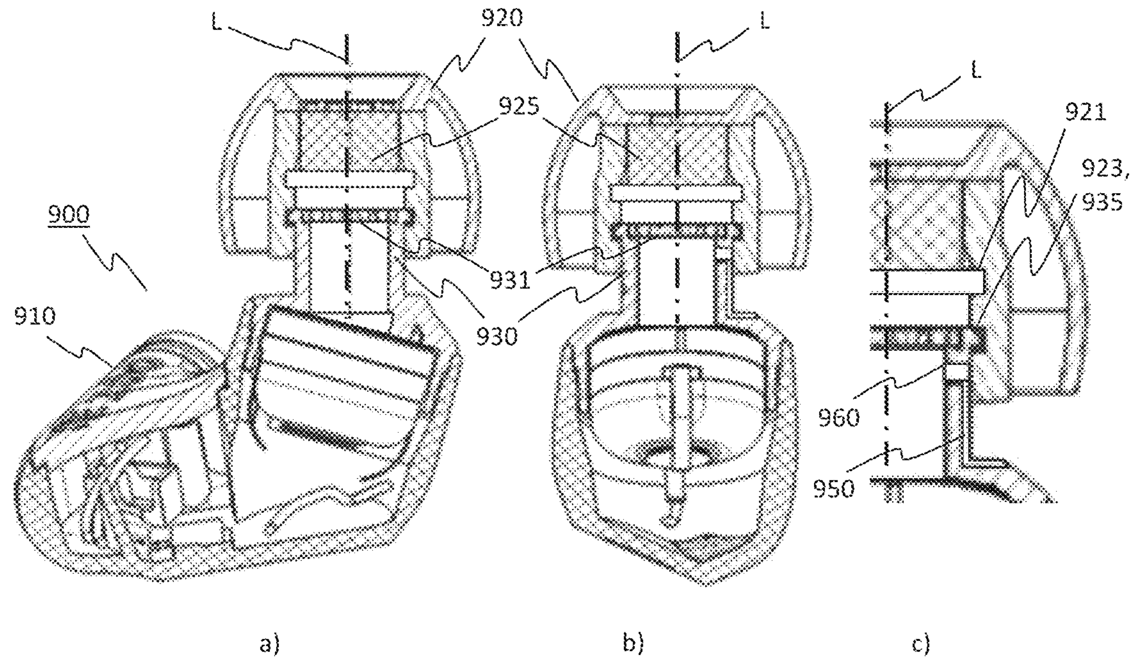
FIG. 10 a sectional drawing of an earphone in the same embodiment with the adjustable ear pad in the second (upper) position without resonator.

FIGS. 9 and 10 show sectional drawings of an earphone 900 in a further embodiment with a bore 960 in the receptacle 930. The ear pad is adjustable such that it can be shifted, or mounted in two different positions respectively, along its longitudinal axis L. As a result, a user (e.g. with a larger ear canal) can improve the fit of the earphone 900 in the ear, because the ear pad 920 can be inserted deeper into the canal, and the position of the earphone relative to the ear canal opening can be adapted. It is particularly important here that the protective grid 931 is securely fixed since a cavity can form between the wax filter 925 and the protective grid 931. Therefore, the acoustic connection of the resonator 723 was realized through a bore 960.

In FIG. 9, the ear pad 920 is in a first, lower position. The projection 935 of the receptacle 930 is located in the groove 921 of the ear pad. Therefore, this groove 921 does not have any acoustic effect. The cavity 923 is connected with the sound channel via a portion of the ventilation slot 950 and the bore 960, and is therefore suitable for acting as a resonator.

In FIG. 10, the ear pad 920 is in a second, upper position, and the earphone may therefore for some users match their individual ear canal better and thus be more pleasant to wear. The projection 935 of the cushion receptacle 930 snaps in the cavity 923, which therefore has no acoustic effect in this position. Also the groove 921 of the ear pad 920 has no resonator effect in this position since it is not connected with the sound channel via a narrow opening and therefore is not a Helmholtz resonator. However, in this position the frequency response is different, partly because the inner volume of the sound channel is larger, and the user may get more benefit from having the earphone deeper in the ear canal, depending on the user's individual ear geometry.

In a similar embodiment with two positions shifted along the longitudinal axis L, the recess 923 within the ear pad may consist of two or more partially circumferential sections, as described above, so that (in the position as shown in FIG. 9) the user may have additional adjustment options by rotating the ear pad about its longitudinal axis L.

Figure 11:
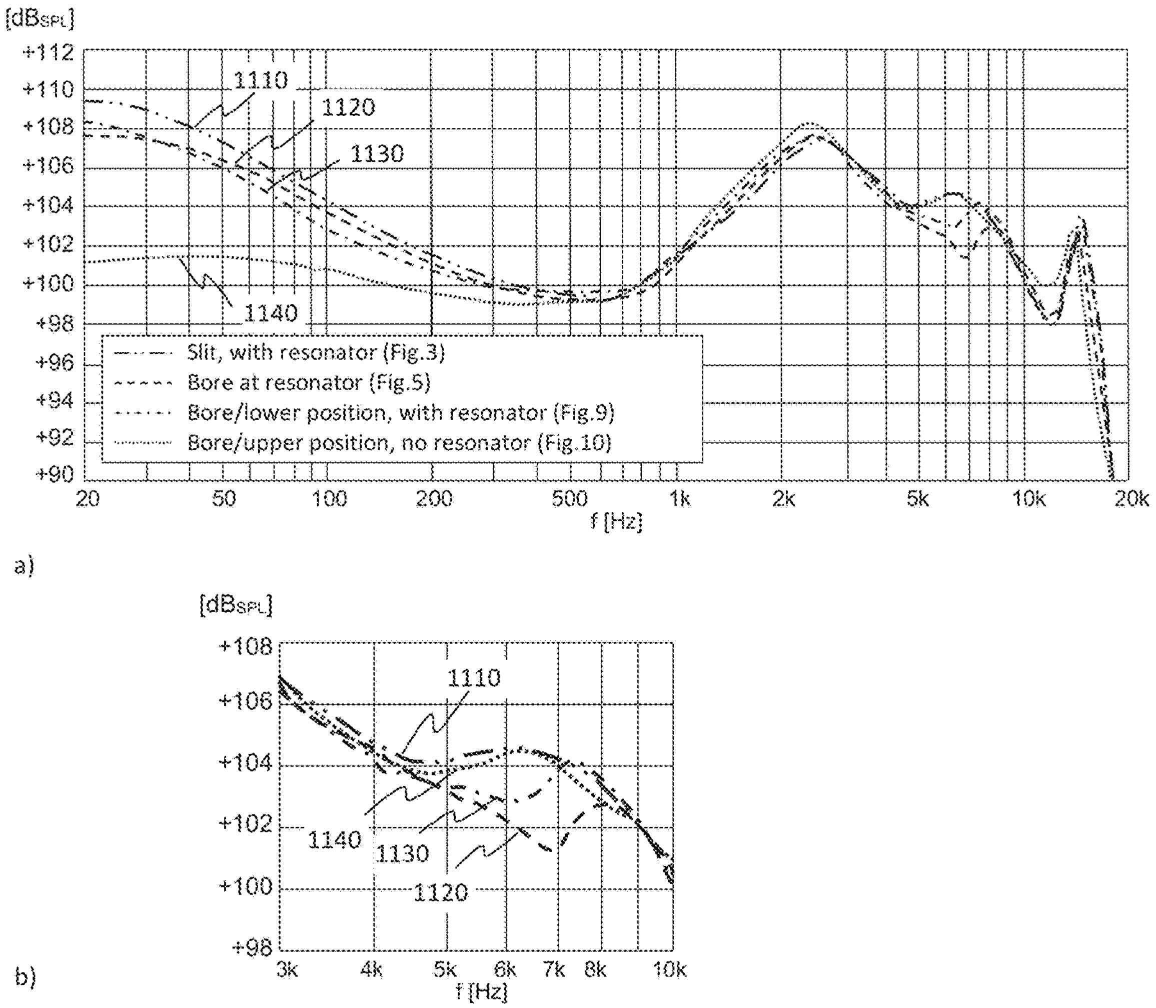
FIG. 11 frequency response diagrams.

FIG. 11 shows frequency response diagrams of different earphones, or ear pads respectively. In FIG. 11 *a*), the entire audible frequency range is depicted. A first curve 1110 shows the frequency response of the embodiment shown in FIG. 3, where the resonator is acoustically connected via a slot. A second curve 1120 relates to an embodiment similar to that shown in FIG. 5, where the resonator is acoustically connected via a bore and (in this case) is aligned with the bore. A third curve 1130 relates to the embodiment shown in FIG. 9 with the adjustable ear pad being in the lower position, and a fourth curve 1140 relates to the same embodiment with the adjustable ear pad being in the upper position, as shown in FIG. 10. The fourth curve 1140 differs in the lower frequency range up to approximately 400 Hz significantly from all other curves since the acoustic resonance and inductance of the ventilation slot is reduced due to its shorter length. However, all depicted curves differ significantly from each other in the frequency range of approximately 4-8 kHz. Therefore, this range is depicted enlarged again in FIG. 11 *b*). Undesired maxima in the curves result from other resonances within the inner volume or the earphone. The center frequency of the respective resonator is at or near the maximum of the respective curve between 4 kHz and 8 kHz. An attenuation or decrease in the frequency response due to the resonator is particularly advantageous in this range.

The resonators of the various embodiments are dimensioned such that their center frequencies deviate slightly from one another. Moreover, it is clear to the skilled person that the individual ear geometry, and thus also the position or fit of the earphone, has a significant impact on the frequency response and the resonant frequencies. By changing the volume of the cavity 323, 523, 723, 724, 923 during its design, the center frequency of the resonator can be shifted or adjusted very easily. Further, it is also possible to change the shape of the curve in the frequency range under consideration via the cross-section of the opening of the connection to the sound channel: the larger the cross-section, the lower is the Q-factor of the Helmholtz resonator (i.e., the wider is the working range of the resonator). As can be seen in FIG. 11 *b*), a higher Q-factor can be achieved (in this example) if the resonator is acoustically connected via a bore instead of a slot. The ventilation slot to the ambience (at least in embodiments shown in FIGS. 3, 5 and 9) has a high acoustic inductance and is irrelevant for the function of the resonator. In principle, internal venting past the sound transducer as in known earphones is also possible. In this case the air is vented into the housing, e.g. behind the sound transducer.

Figure 12:
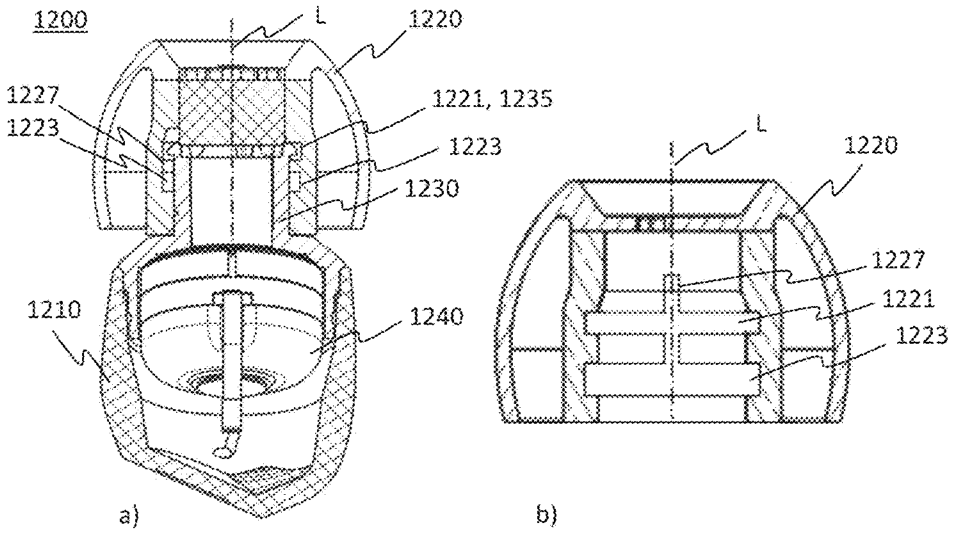
FIG. 12 a sectional drawing of an earphone with an ear pad according to an embodiment.

However, an acoustic connection of the cavity via a slot instead of a bore can also be advantageous. One advantage of this configuration is that the resonator effect is achievable with the ear pad alone, so that also those earphones whose receptacle has no bore and no slot can be retrofitted with an ear pad. FIG. 12 shows a sectional drawing of an earphone 1200, in which the cushion receptacle 1230 has neither a slot nor a bore, equipped with an ear pad 1220 in an embodiment. In the ear pad 1220, a slot, recess or cavity respectively 1227 that is substantially parallel to the length axis L is provided that acoustically connects the recess or cavity 1223 with the sound channel and thus enables a resonator effect. Generally, also the shape or nature of the slot 1227 has an influence on the resonant frequency and the Q-factor of the resonator. In principle, the ear pad 1220 of this embodiment may also be used for earphones whose receptacle has a bore; the resonant effect depends on the cross-sectional areas of both the bore and the slot 1227 then, apart from the volume of the cavity. Further, the slot 1227 may optionally extend to the lower edge and thus be suitable for venting (not shown). Alternatively, the inner volume can be ventilated in another way, e.g. past the sound transducer 1240. In principle, the ventilation can also be provided by connecting the cavity 1227 to the ambient air through an axial or radial opening in the ear pad (not shown).

It is clear for a person skilled in the art that various of the above-mentioned embodiments may be combined with one other, even if such combination is not expressly mentioned. For example, the cushion receptacle may have different cross-sections, e.g. oval or polygonal. Ventilation slots may be provided in either or both the receptacle and the ear pad. Another possible variation is a spiral cavity within the earpad that may span an angle that is over 360°. Further, other materials or shapes (such as user-specific earmolds, for example) may be used for the ear pad, instead of silicon. It is important that the volume of the connected external resonator is inherently sealed and that it seals tightly to the housing except for the intentional vent. Thus, many other dense and non-porous materials are conceivable. Furthermore, a combination with a software equalizer in the earphone is possible by electronically detecting the position of the cushion and using this information to control the equalizer.

The resonator effect may relate to a frequency or frequency range in the audible spectrum, e.g., in the range of 4-15 kHz, and more particularly in the range of 5.5-7 kHz. Higher frequencies may also be covered, including frequencies beyond the audible spectrum. In principle, also lower frequencies can be covered, e.g. in the range of 2-4 kHz or even lower, but this requires a larger volume of the cavities in the ear pad. Therefore, special design measures may be taken for this case, e.g. special materials, so that the walls are sufficiently stable. Instead of an ear pad, which may be but usually is not user-specific, the features described herein can in general also be realized as an earmold, which is usually produced by injection molding and has a shape individually adapted for a specific user.

It is noted that some terms are used synonymously herein, such as e.g. "cushion", "ear tip" and "ear pad", or "auditory canal" and "ear canal". Further, a recess in the unmounted ear pad or earmold generally corresponds to a cavity in the assembled earphone.

In the drawings, the reference signs have the following generic meaning:

x00 an earphone,
x10 a housing,
x20 a cushion or ear pad,
x21 a cavity in the cushion for accommodating a projection x35,
x22 a cavity in a known cushion not acting as a resonator
x23 a cavity in the cushion (as resonator), or a larger cavity in the cushion with 2 resonators,
x24 a smaller cavity (as resonator) in the cushion with 2 resonators,
x25 a wax filter,
x27 a cavity in the cushion for connecting the resonator,
x28 an opening in the cushion that partially forms the sound channel,
x30 a cushion receptacle being a part of the housing,
x31 a protective grid at the upper end of the cushion receptacle,
x35 a projection at the cushion receptacle for engaging with the cushion,
x38 a part of the sound channel within the cushion receptacle,
x40 a sound transducer,
x50 a ventilation slot in the cushion receptacle,
x60 a bore in the cushion receptacle,
x70 an indicator.

What is claimed is:

1. An ear pad or earmold for an earphone, wherein the ear pad or earmold is adapted for being mounted on a receptacle of the earphone, and wherein the ear pad or earmold has a sound channel that is suitable for guiding sound from a transducer inside the earphone, wherein the ear pad or earmold has at least one recess which is acoustically connected with the sound channel of the ear pad or earmold when the ear pad or earmold is mounted on the receptacle of the earphone and forms a cavity then, and which is suitable for acting as an acoustic resonator in an audible frequency range, wherein a volume of the cavity is smaller than a volume of the sound channel, and wherein the at least one recess extends only over a part of an inner circumference of the ear pad or earmold by an angle $a_1$ with $a_1$<360°, wherein the sound channel of the ear pad or earmold can be acoustically connected to the cavity or disconnected from the cavity by rotating the ear pad or earmold around its longitudinal axis L.

2. The ear pad or earmold according to claim 1, wherein the ear pad or earmold comprises at least a first recess and a second recess that both extend only over a part of the inner circumference of the ear pad or earmold, wherein, after mounting the ear pad or earmold on the receptacle of the earphone, the first and the second recesses form first and second cavities that have different volumes, and wherein the sound channel of the ear pad or earmold can be acoustically connected to either the first or the second cavity or both by rotating the ear pad or earmold around its longitudinal axis L.

3. The ear pad or earmold according to claim 1, further comprising an axial slot in its inner area, wherein, after mounting the ear pad or earmold on the receptacle of the earphone, the at least one cavity is connected with the sound channel of the ear pad or earmold via different portions of the axial slot in the ear pad or ear-mold.

4. An earphone comprising:

a housing comprising a sound transducer; and an ear pad or earmold, the ear pad or earmold being mounted on a tubular receptacle of the housing, wherein the receptacle serves as a sound channel of the housing, and wherein the ear pad or earmold is configured such that sound from the sound transducer inside the housing can be directed out of a first opening of the receptacle and/or through a sound channel of the ear pad or earmold, wherein the ear pad or earmold has at least one recess which forms at least one cavity with the receptacle of the earphone when the ear pad or earmold is mounted on said receptacle, and wherein the at least one cavity of the ear pad or earmold is acoustically connected with the sound channel of the ear pad or earmold and/or the sound channel of the receptacle and is configured for acting as an acoustic resonator in an audible frequency range, wherein the ear pad or earmold is rotatable on the receptacle about its longitudinal axis L, and wherein a user can selectively either establish or break the acoustic connection of the sound channel with the at least one cavity by rotating the ear pad or earmold.

5. The earphone according to claim 4, wherein the at least one cavity is acoustically connected with the sound channel via a second, lateral opening in the receptacle.

6. The earphone according to claim 5, wherein the acoustic connection between the at least one cavity and the sound channel also comprises a portion of an axial slot.

7. The earphone according to claim 4, wherein the at least one cavity is acoustically connected with the sound channel via a slot at the outside of the receptacle.

8. The earphone according to claim 4, wherein the ear pad or earmold comprises at least a first recess and a second recess forming a first cavity and a second cavity when the ear pad or earmold is mounted on the receptacle, wherein the first and second cavities are at least partially at the same height with respect to a longitudinal axis L of the ear pad or earmold and have different volumes, and wherein the sound channel of the housing and/or of the ear pad or earmold can be acoustically connected selectively either with the first or the second cavity by rotating the ear pad or earmold about its longitudinal axis L.

9. The earphone according to claim 8, wherein the receptacle has at least two lateral openings, and wherein further both the first and second cavities can be acoustically connected selectively with the sound channel simultaneously through said lateral openings by rotating the ear pad or earmold.

10. The earphone according to claim 4, wherein the at least one cavity is a first cavity and the ear pad or earmold further comprises at least a second recess forming a second cavity, the first and second cavities being at different heights with respect to a longitudinal axis L of the ear pad or earmold, wherein each of the first cavity and the second cavity is adapted for engaging with a projection or collar on the receptacle.

11. The earphone according to claim 4, wherein the at least one cavity is acoustically connected with the ambience via a slot at the outside of the receptacle.

12. The earphone according to claim 4, wherein the at least one cavity is acoustically connected with the sound channel via a slot at the inside of the ear pad.

13. The earphone according to claim 4, wherein the cavity is adapted for acting as an acoustic resonator for a selected frequency in the frequency range of 4-8 kHz.

14. An ear pad or earmold for an earphone, wherein the ear pad or earmold is adapted for being mounted on a receptacle of the earphone, and wherein the ear pad or earmold has a sound channel that is suitable for guiding sound from a transducer inside the earphone, wherein the ear pad or earmold has at least one recess which is acoustically connected with the sound channel of the ear pad or earmold when the ear pad or earmold is mounted on the receptacle of the earphone and forms a cavity then, and which is suitable for acting as an acoustic resonator in an audible frequency range, wherein a volume of the cavity is smaller than a volume of the sound channel, and wherein the at least one recess extends annularly over the entire inner circumference of the ear pad or earmold.

15. The ear pad or earmold according to claim 14, wherein the ear pad or earmold comprises at least a first recess and a second recess, the first recess extending annularly over the entire inner circumference of the ear pad or earmold and the second recess extending over at least part of an inner circumference of the ear pad or earmold, wherein after mounting the ear pad or earmold on the receptacle of the earphone, the first and the second recesses form first and second cavities that have different volumes, and wherein the sound channel of the ear pad or earmold can be acoustically connected to either the first or the second cavity or both by rotating the ear pad or earmold around its longitudinal axis L.

16. The ear pad or earmold according to claim 14, further comprising an axial slot in its inner area, wherein, after mounting the ear pad or earmold on the receptacle of the earphone, the at least one cavity is connected with the sound channel of the ear pad or earmold via said axial slot.

* * * * *